(12) United States Patent
Tsur et al.

(10) Patent No.: US 10,935,775 B2
(45) Date of Patent: Mar. 2, 2021

(54) METHOD AND APPARATUS THAT ENHANCE THE VIEWING EXPERIENCE OF DIGITAL DISPLAYS FOR LONG SIGHTED USERS

(71) Applicant: PhoneOptika Ltd., Sde Warburg (IL)

(72) Inventors: Shraga Tsur, Tel Aviv (IL); Arie Heiman, Sde Warburg (IL)

(73) Assignee: PHONEOPTIKA LTD, Sde Warburg (IL)

( * ) Notice: Subject to any disclaimer, the term of this patent is extended or adjusted under 35 U.S.C. 154(b) by 91 days.

(21) Appl. No.: 15/979,688

(22) Filed: May 15, 2018

(65) Prior Publication Data
US 2018/0335615 A1 Nov. 22, 2018

Related U.S. Application Data

(60) Provisional application No. 62/507,933, filed on May 18, 2017.

(51) Int. Cl.
| | |
|---|---|
| *G02B 21/02* | (2006.01) |
| *G02B 3/00* | (2006.01) |
| *G02B 5/20* | (2006.01) |
| *G02B 21/36* | (2006.01) |
| *G02B 5/02* | (2006.01) |
| *G02B 27/46* | (2006.01) |
| *G02F 1/1335* | (2006.01) |
| *G02B 27/30* | (2006.01) |
| *B29D 11/00* | (2006.01) |

(52) U.S. Cl.
CPC ......... *G02B 21/025* (2013.01); *G02B 3/0012* (2013.01); *G02B 3/0056* (2013.01); *G02B 5/0294* (2013.01); *G02B 5/201* (2013.01); *G02B 21/361* (2013.01); *G02B 27/30* (2013.01); *G02B 27/46* (2013.01); *G02F 1/133524* (2013.01); *G02F 1/133526* (2013.01); *B29D 11/00365* (2013.01); *G02F 2001/133562* (2013.01)

(58) Field of Classification Search
CPC .. G02B 21/025; G02B 21/361; G02B 3/0012; G02B 3/0056; G02B 5/0294; G02B 5/201; G02B 27/30; G02B 27/46; G02F 1/133524; G02F 1/133526; G02F 2001/133562; B29D 11/00365
USPC ........................................................ 359/380
See application file for complete search history.

(56) References Cited

U.S. PATENT DOCUMENTS

| | | | | | |
|---|---|---|---|---|---|
| 5,270,859 | A | * | 12/1993 | Wirth | G02B 3/0062 359/419 |
| 5,351,151 | A | * | 9/1994 | Levy | G02B 3/0043 359/237 |
| 5,396,350 | A | * | 3/1995 | Beeson | F21V 5/02 349/62 |
| 5,822,125 | A | * | 10/1998 | Meyers | H04N 5/2254 359/621 |
| 6,137,535 | A | * | 10/2000 | Meyers | G02B 3/0043 348/340 |
| 6,169,594 | B1 | * | 1/2001 | Aye | G02B 5/045 349/196 |
| 6,498,685 | B1 | * | 12/2002 | Johnson | B81C 1/0038 347/241 |
| 7,050,020 | B2 | * | 5/2006 | Uehara | G02B 3/005 345/6 |

(Continued)

*Primary Examiner* — Collin X Beatty
(74) *Attorney, Agent, or Firm* — Reches Patent

(57) ABSTRACT

An apparatus and method for increasing display visibility.

21 Claims, 8 Drawing Sheets

(56) References Cited

U.S. PATENT DOCUMENTS

| | | | | |
|---|---|---|---|---|
| 7,529,383 | B2* | 5/2009 | Miyatake | H04N 5/2253 |
| | | | | 382/100 |
| 7,986,374 | B2* | 7/2011 | Ijzerman | G02B 27/2214 |
| | | | | 349/15 |
| 8,736,675 | B1* | 5/2014 | Holzbach | G03H 1/2294 |
| | | | | 348/59 |
| 9,874,761 | B2* | 1/2018 | Van Putten | G02B 27/2214 |
| 9,904,065 | B2* | 2/2018 | Jin | G02B 27/2214 |
| 9,945,988 | B2* | 4/2018 | Powell | G02B 3/0062 |
| 10,191,188 | B2* | 1/2019 | Powell | G06K 9/00033 |
| 2004/0240777 | A1* | 12/2004 | Woodgate | G02B 27/2214 |
| | | | | 385/16 |
| 2008/0144174 | A1* | 6/2008 | Lucente | H04N 13/307 |
| | | | | 359/463 |
| 2011/0242461 | A1* | 10/2011 | Escuti | G02F 1/133504 |
| | | | | 349/96 |

* cited by examiner

METHOD AND APPARATUS THAT ENHANCE THE VIEWING EXPERIENCE OF DIGITAL DISPLAYS FOR LONG SIGHTED USERS

CROSS REFERENCE

This application claims the priority of U.S. provisional patent 62/507,933 filing date May 18, 2017.

BACKGROUND

Today digital displays are very popular. They are used in mobile phones, smart phones, wearable devices, tablets, computers, TV, cars, digital camera, etc. However, in some cases the user encounters challenges that reduce significantly his viewing experience.

SUMMARY

There may be provided an apparatus and a method for increasing display visibility.

There may be provided an apparatus for enhancing display visibility of a display that may include multiple display pixels, the apparatus may include an array of spatial filters that may be construed and arranged to block side ambient radiation; wherein each spatial filter has a minimal thickness of microscopic scale; transparent elements that may be positioned between the spatial filters of the array; multiple arrays of microlenses that may be spaced apart from each other and may be configured to direct radiation generated by the display to propagate through the transparent elements without impinging on the array of spatial filters, while simulating infinity focus.

The apparatus may be configured to convert the radiation generated by the display to the output radiation without introducing human perceivable distortions and loss of resolution.

The second array of microlenses may be configured to disperse reflected ambient radiation that impinges on the second array of microlenses.

The multiple arrays may include a first array of microlenses and a second array of microlenses.

The first and second arrays of microlenses may form an array of micro-binoculars.

Each single micro-binocular may be associated with a part of a pixel or a pixel and its surrounding.

Each display pixel may be associated with a single microlenses of the first array of microlenses, with a single microlenses of the second array of microlenses, with a single transparent element, and with a single spatial filter.

A focal point of a microlenses of the first array of microlenses overlaps a focal point of a corresponding microlenses of the second array of microlenses.

The second array of microlenses may include negative microlenses; and wherein the first array of microlenses may include positive microlenses.

The first and second arrays of microlenses may form an array of micro-telescopes.

Each single micro-telescope may be associated with a part of a pixel or a pixel and its surrounding.

The apparatus may include an anti-reflective coating layer.

The first array of microlenses may be positioned between an interior end of the array of spatial filters and an exterior end of the array of spatial filters.

The first array of microlenses may be positioned below the array of spatial filters.

The second array of microlenses may be positioned above an interior end of the array of the spatial filters.

The microlenses of the first array of microlenses and the microlenses of the second array of microlenses may be positioned at opposite sides of an interior plane located at the interior end of the array of the spatial filters.

The array of the spatial filters may define an array of apertures that may be positioned at the interior plane.

Focal points of microlenses of the first array of microlenses may be positioned at the interior plane.

Focal points of microlenses of the second array of microlenses may be positioned at the interior plane.

The second array of microlenses may be configured to disperse reflected ambient radiation that impinges on the second array of microlenses.

There may be provided a method for enhancing display visibility of a display that may include multiple display pixels, the method may include: blocking, by an array of spatial filters, side ambient radiation; wherein each spatial filter has a minimal thickness of microscopic scale; enabling, by transparent elements that may be positioned between the spatial filters of the array, radiation generated by the display to propagate outwards; and directing, by multiple arrays of microlenses that may be spaced apart from each other, radiation generated by the display to propagate through the transparent elements without impinging on the array of spatial filters, while simulating infinity focus.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE DRAWINGS

Most people approaching 40 years old or above, see well objects that are far, but see blurred objects when they are in reading distance from their eyes.

To fix it, those people are using reading glasses which enable them to focus on near objects, however they don't need the eyeglass to see images that are far. In typical scenarios, most of the day they don't wear eyeglass, hence it is very common that when people need to read a message from their digital display (mobile phone, Tablet, digital watch etc.) they need the reading glasses which are not available. This is very annoying as they need to look after their eyeglass.

To solve the reading issue one can use a magnifying glass which of course is not a practical solution; if one wants to see the entire display image he should use a big magnifying glass that is bigger than the display and to place the display in its focal plane in order to obtain its image at infinity.

There are provided a method and apparatus that eliminate the need of using reading glass in order to read the content of a digital display. This is done by adding a special thin film on top of the device which converts the image of the display to be conceived by the user eye as if it is far, at infinity. The apparatus can be embedded as an additional thin layer of the display or below the display or can be used as an add-on transparent thin film that covers the display.

It should be noted that a user who do not need to wear eye glasses and see far and near objects sharply, will see well even when the thin film is attached to the display.

Figure 1:
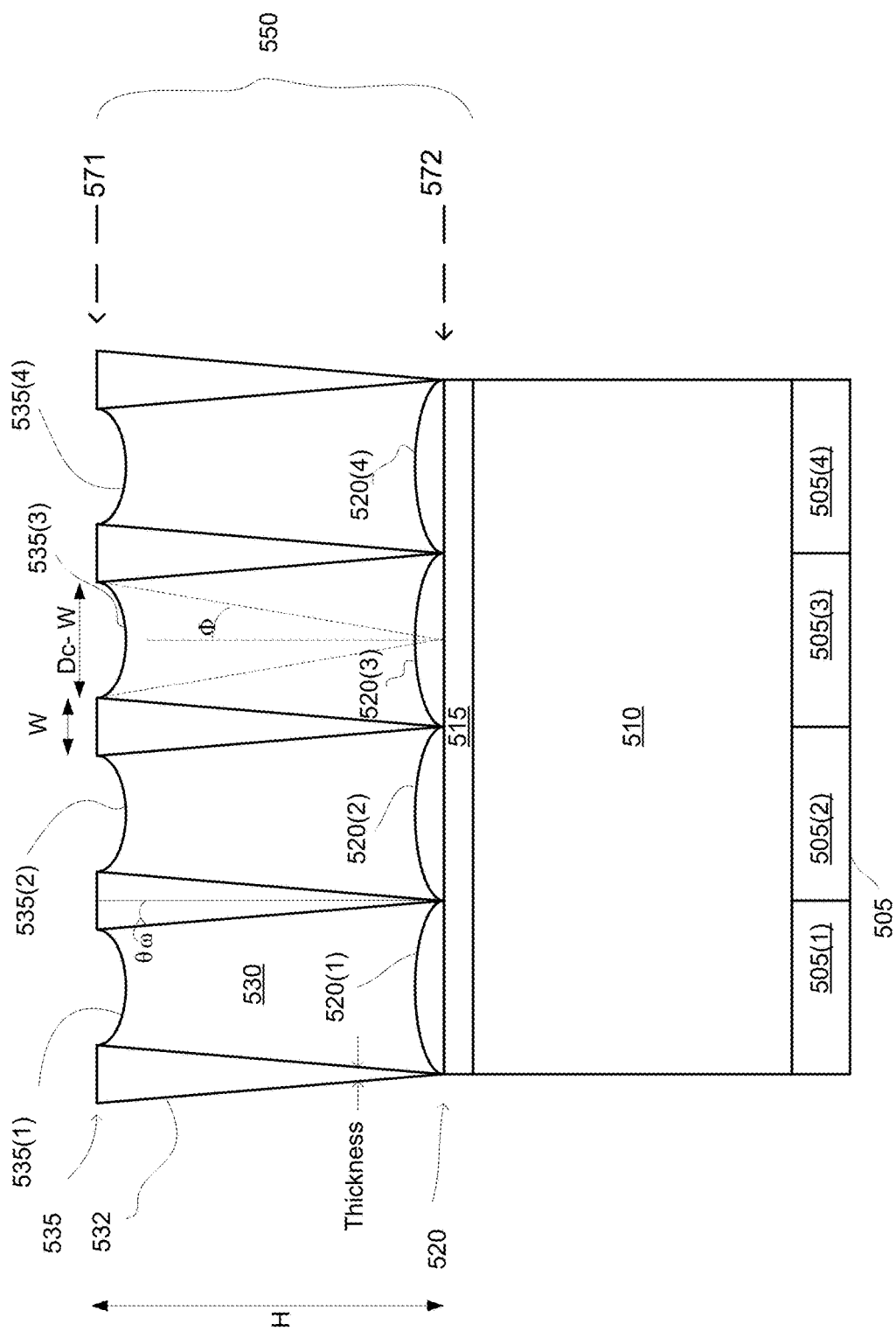
FIG. 1 is an example of one or more parts of an apparatus and of a display.

FIG. 1 illustrates an example of an apparatus 550, glass layer 510 and pixel layer 505 (including pixels 505(1)-505(4)).

Apparatus 550 (may be in the form of a thin layer element) is attached to glass layer 510, and may include:
 a. Base layer 515 that may include an index matching glue between the display and the cover which decreases the reflection from that interface.
 b. A first array of microlenses 520 (such as microlenses 520(1)-520(4)), with width Dc and focal length f1.
 c. An array of spatial filters 532. The array of spatial filters may be arranged to keep the resolution of the image. The array of spatial filters includes an interior end 572 and an exterior end 571. The surrounding of the spatial filter is a transparent element 530.
 d. A second array of microlenses 535 (for example negative lenses 535(1)-535(4) having a pitch Dc and focal length f2 that resides on the upper layer. The second array of microlenses may be arranged to (a) re-collimate the displayed image to the desired field of view, and (b) act as a matte surface.

The focal points of the lenses of the first array of microlenses and the focal points of the lenses of the second array of microlenses are located at the same focal plane—forming a binocular optical system in which, the image of the display is seen at infinity. Thus the image of the display can be clearly seen by a person with impaired vision. The person sees an image that is optically located in infinity—far away from the eye of the user—and is seen sharply by the user.

Each part of the display with dimensions Dc is associated with a microlens of the first array of microlenses and a corresponding microlens of the second array of microlenses. The pair of microlenses from the first and second arrays of microlenses form a micro-binocular. It must be noted that even in the case where more than a pixel or a group of pixels is imaged via the same lens, there is no loss of resolution as long as the blur circle of the eye on the display is larger than Dc.

Accordingly—the first and second arrays of microlenses form an array of micro-binoculars.

Figure 2:
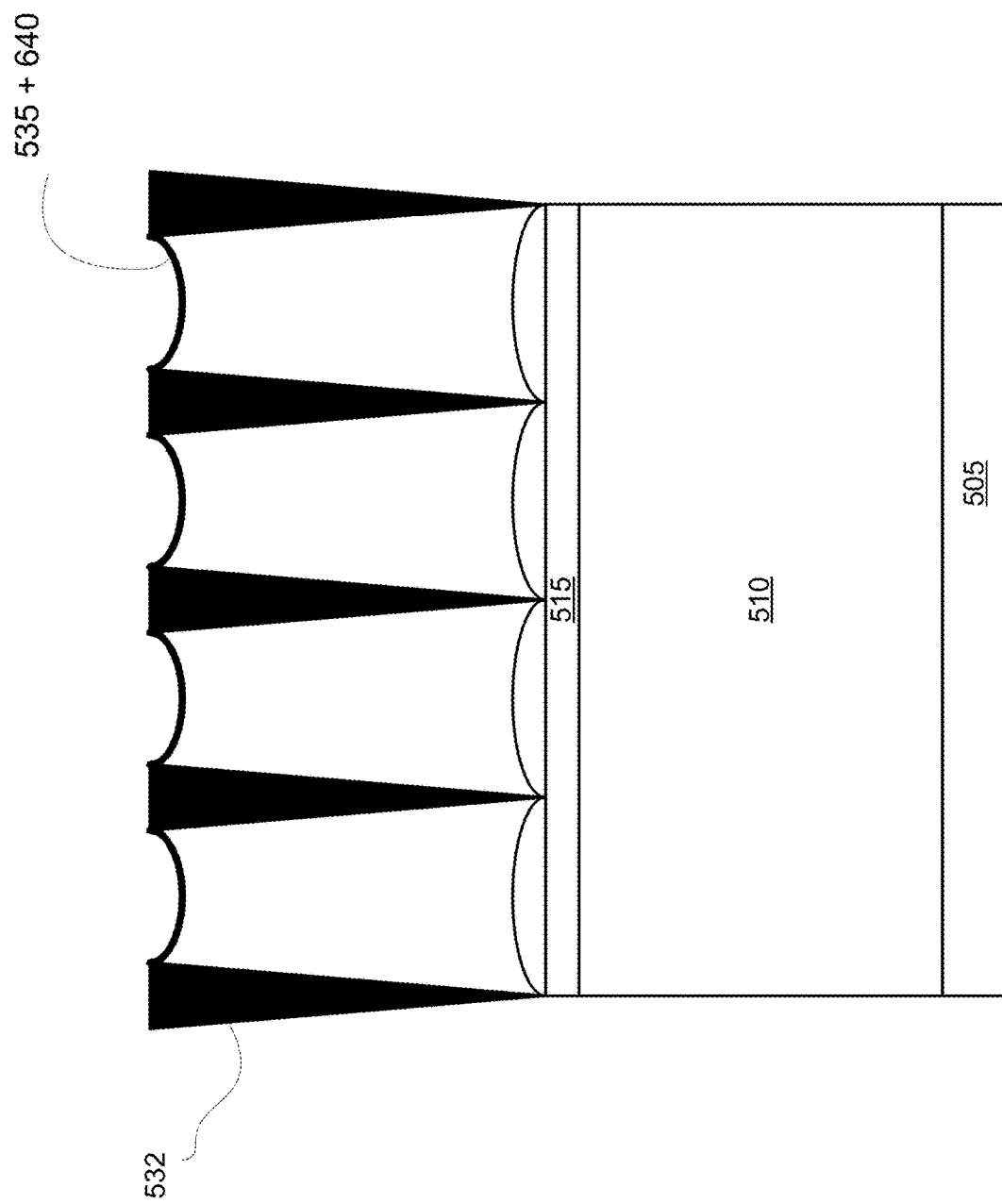
FIG. 2 is an example of one or more parts of an apparatus and of a display.

Apparatus 550 may also include an ARC (Anti-Reflective Coating) layer. It is denoted 640 in FIG. 2. In FIG. 2 the ARC layer is positioned on the second array of microlenses. The ARC layer may further decrease the brightness and contrast of the reflected ambient image and light.

It should be noted that one can use only part of the above-mentioned layers or organize them in a different order as well as to add more layers or combine the layers into one layer.

Figure 3:
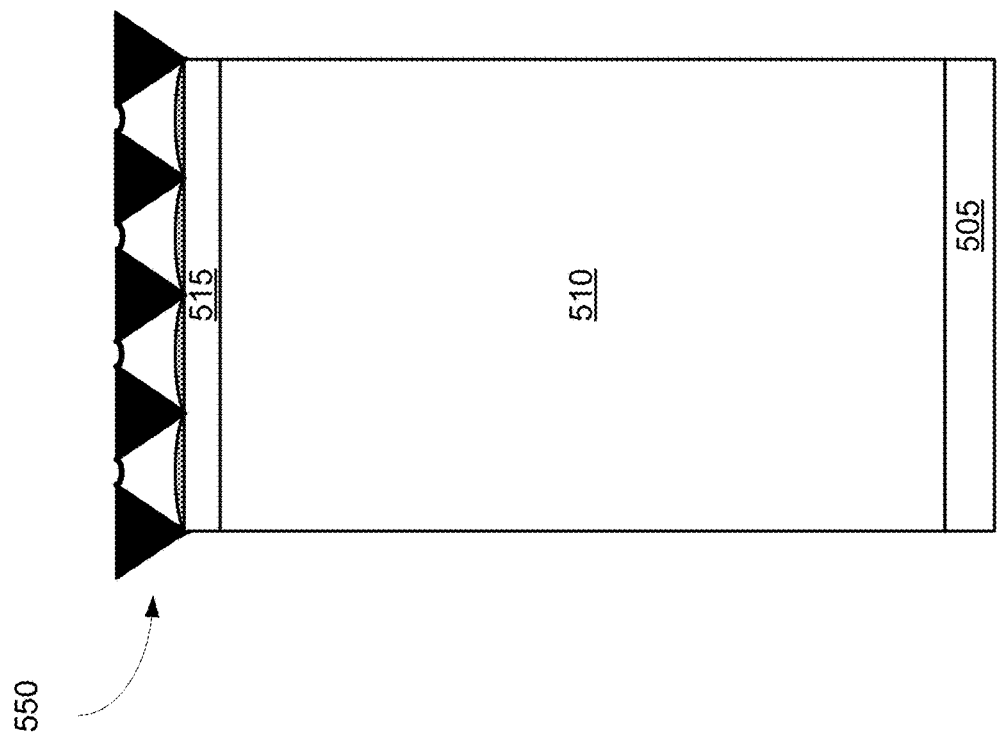
FIG. 3 is an example of one or more parts of an apparatus and of a display.

FIG. 3 also illustrates apparatus 550, glass layer 510 and pixels 505—and illustrates that the glass layer 510 is much higher than apparatus 550.

The spatial filter of array 532 may include rectangular micro-elements—or micro-elements of other shapes—for example triangles, rectangles, hexagonal etc.

Figure 4:
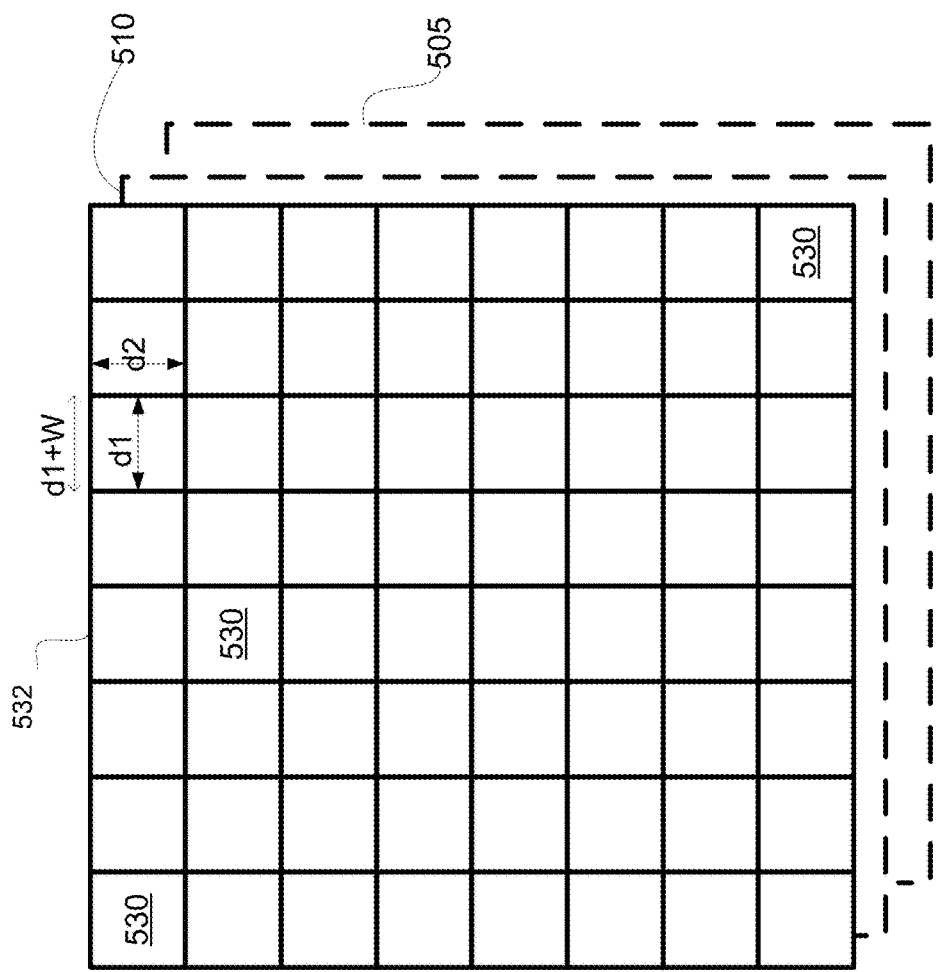
FIG. 4 is an example of one or more parts of an apparatus and of a display.

In FIG. 4 rectangular spatial filters are shown—each surrounding a transparent element 530 having a size of d1*d2 and height H.

The transparent element allows the rays that are generated in the display 505 to penetrate via the transparent material toward the eye of the user which enables him to see the content that is displayed. In various figures each pixel is associated with a pair of microlenses (one microlens of the first array and one microlens of the second array). It should be noted that more than a single pixel may be associated with a single pair of microlenses. It should be noted that both cases (single pixel or a group of pixels associated with a pair of microlenses) the image displayed on the display may be outputted to the user without distortions that are noticeable to the human eye. Accordingly—in both cases there is no loss of resolution because a blur circle of a human eye on the display is larger than the size of the pixel. Furthermore—while various figures illustrate the pixels as having the same width as the microlenses of the first and second arrays—it should be noted that the pixels may be shorter or longer than the microlenses of the first and second arrays.

FIGS. 1-3 and 5 illustrate spatial filters that have a V-cross section—their thickness increases towards the exterior end of the array.

The spatial filters absorb side ambient rays that are coming at an angle that exceeds Ø relative to the vertical to the display.

The spatial filters may be made of a material that may include black pigments. The black walls can be perpendiculars of height H and width W, or for reasons of manufacturability have a V shape as depicted in FIGS. 1-3 and 5.

In FIG. 4 the visual area of each transparent element is $(d1-W)*(d2-W)$, where $W=2H*\tan(\theta\omega)$, d1 and d2 are the dimensions of the transparent element in the base. For simplicity we choose that d1=d2=Dc and the height of the element is H. Typical values of Dc, W and H may be on the scale of micrometers. Dc, H and $\theta\omega$ have a significant impact on filtering of the ambient light that is not perpendicular to the display, on the other hand if H is too high, W increases and the light coming from the display will be attenuated significantly. Dc may be on the order of the pixel pitch in order to maintain the resolution of the display but somewhat different, in order to avoid possible Moiré artifacts.

It is clear that as d1 and d2 are reduced and/or H becomes higher it will increase the filtered ambient light effect. However, decreasing of Dc depends on W. W the width of the black V shape wall, must obey $W/di \ll 1$ for both d1 and d2, to ensure that the intensity of light coming from the display is almost not attenuated, however this puts a major constrain on the size of H, namely H will need to be very small, hence the attenuation of the ambient light will be small.

To overcome this issue the apparatus includes the first array of microlenses 520—in which each microlens has width Dc which is adjusted to the spatial filters 532 (see FIG. 1).

The focal length f1 of the microlenses of the first array of microlenses 520 may be designed such that it will collimate most of the energy of the display that is received in each cell onto the second array of microlenses.

This will allow us to choose d1, d2, H and θω without affecting the energy of the cell in the display.

The second array of microlenses 535 may maximize the display intensity at the user eye. The second array of microlenses may include of negative lenses with a focal length of f2.

By defining the values of f1 and f2 one can achieve the desired field of view (FOV) β.

Layer 535 has two functionalities 1: To re collimate the rays to the desired FOV. 2. To project the image of the display to Infinity.

Due to the repetitive elements of pitch of approximately 40 micrometer it acts also as matte surface which diffuses the ambient image that is reflected from the surface of the cover glass.

FIGS. 1-3 illustrate that each pixel and its vicinity are surrounded by a spatial filter and is associated with dedicated microlenses of the first and second microlenses arrays. Each pixel is optically projected by the pair of microlenses outside the apparatus, due to the large distance of the eye compared to the size of the cell, there is no mix between neighbor pixels, which means that the resolution of the display is preserved.

FIGS. 1-3 illustrate spatial filters of thickness that decrease towards the display and the first and second arrays of microlenses were proximate to the interior and external ends of the array of spatial filters, respectively. The first array of microlenses did not exceed the interior end of the array of spatial filters.

Figure 6:
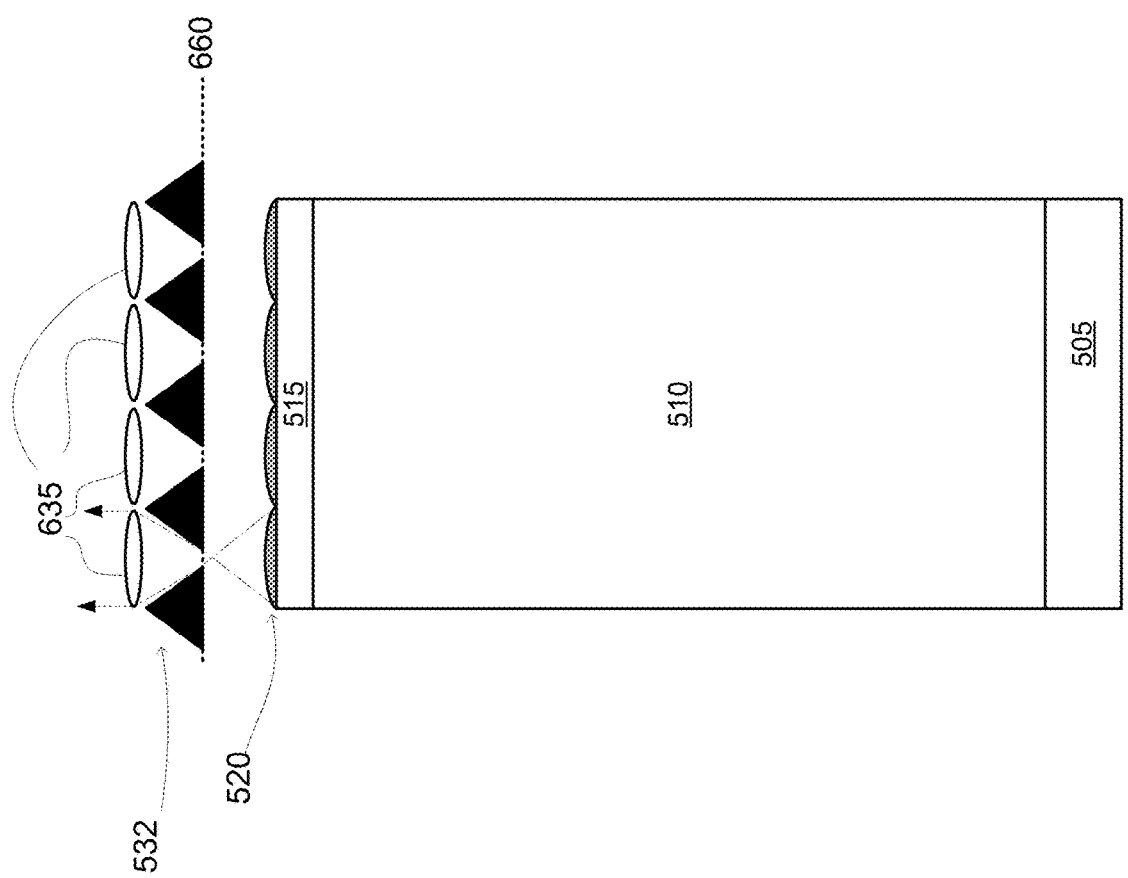
FIG. 6 is an example of one or more parts of an apparatus and of a display.
Figure 7:
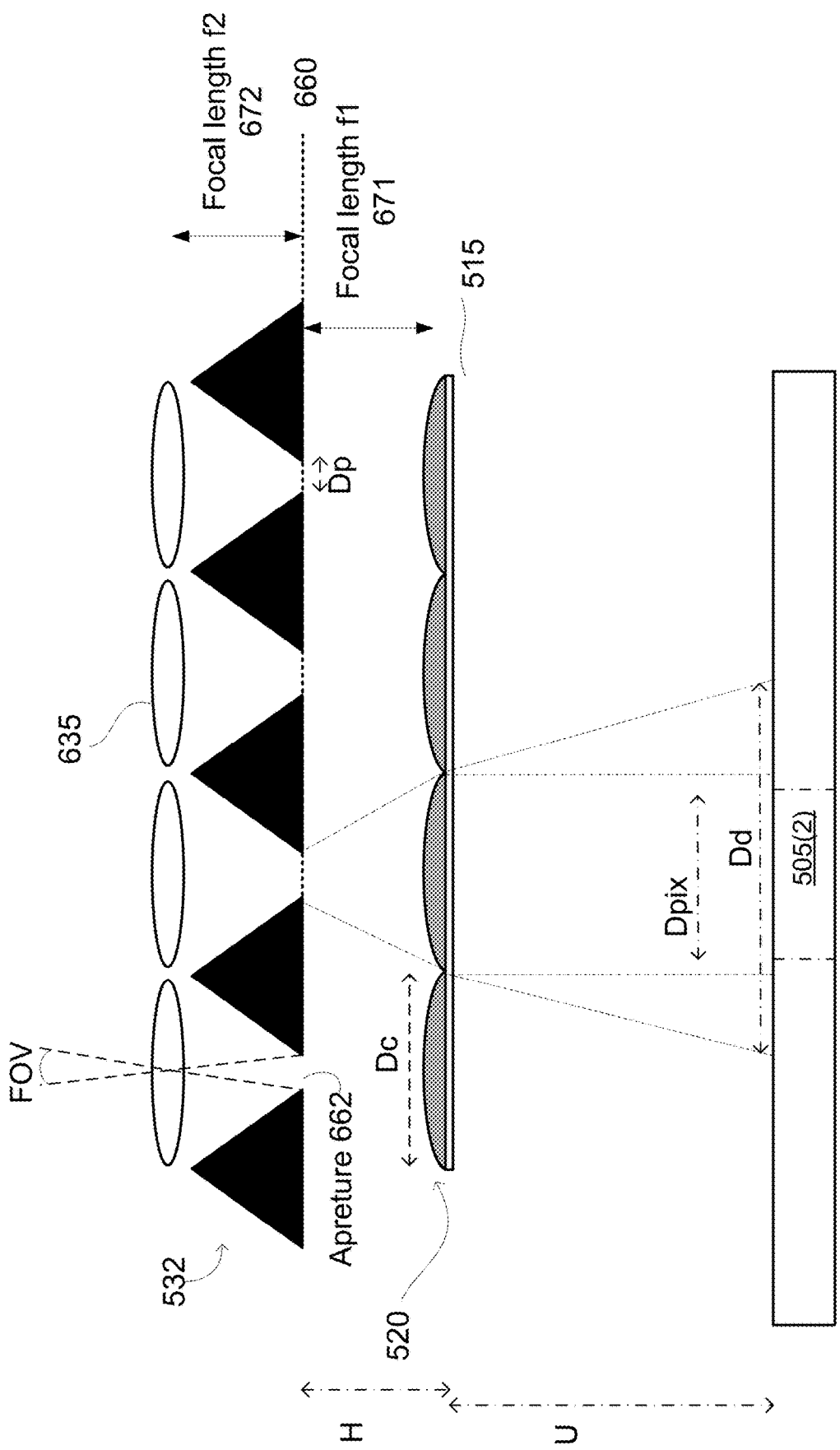
FIG. 7 is an example of one or more parts of an apparatus and of a display.
Figure 8:
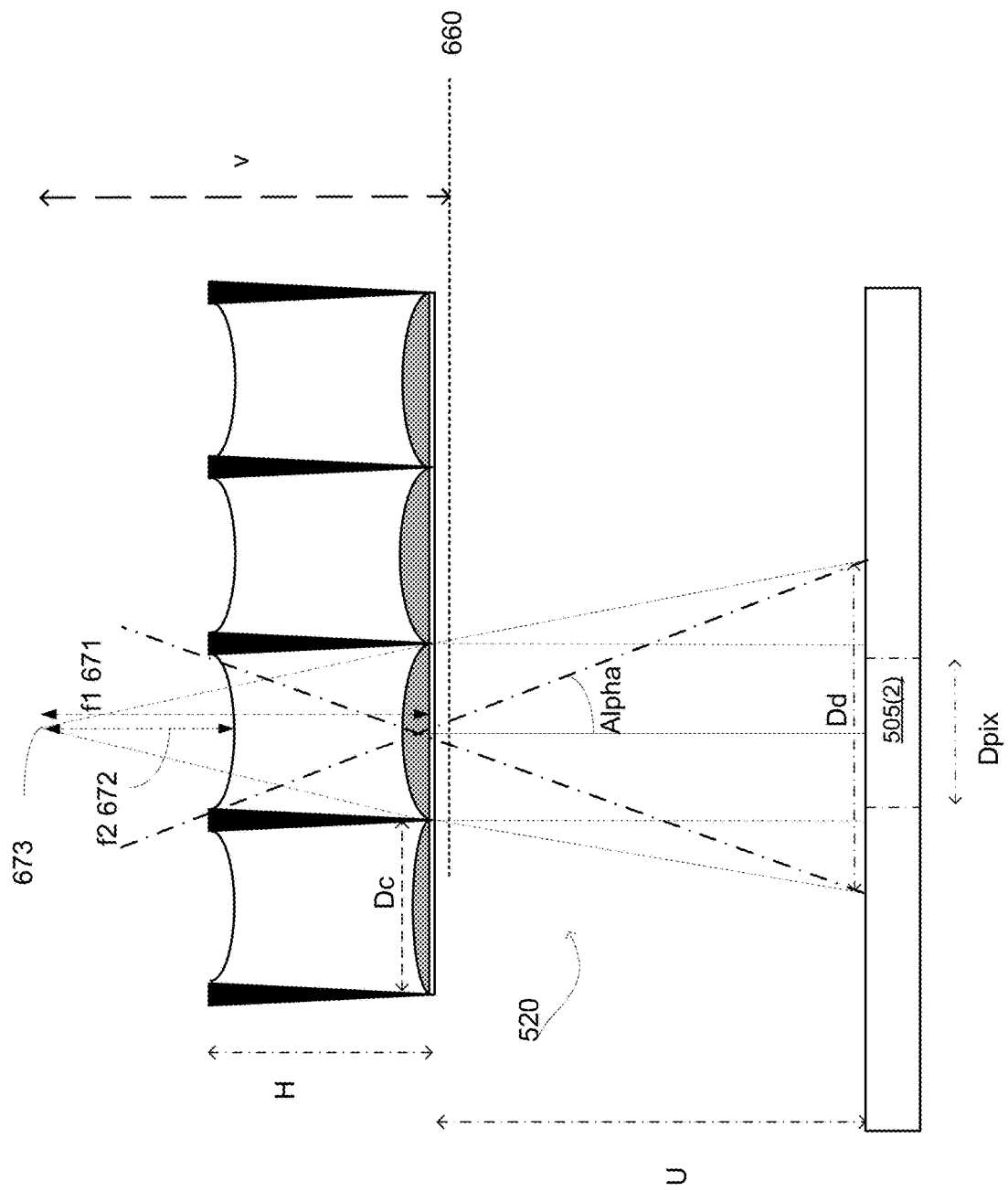
FIG. 8 is an example of one or more parts of an apparatus and of a display.

FIGS. 6-7 illustrate that spatial filters that have a thickness that increases towards the display, the array of spatial filters is spaced apart from the first array of microlenses and the second array of microlenses is positioned near the exterior end of the array of spatial filters.

The first and second arrays of microlenses form a microtelescopes that may have a magnification factor that may equal one or may differ from one by a small amount.

The first array of microlenses 520 images pixels to pin holes (apertures 662 of FIG. 7 having a width of Dp) formed by the array of spatial filters 532. The array of spatial filters blocks side ambient light and preserves the image resolution by preventing crosstalk between adjacent cells.

The second array of microlenses includes positive lenses 635 with f2 that re-collimate the light to provide the desired FOV. In cases where f1 and f2 have a common focal plane, the display image rays on the optical axis of each cell will become parallel. The focal lengths f1 and f2 may also determine the brightness of the display and the range of viewing angles from the perpendicular to the display.

In cases where f1 and f2, and the microlenses of the micro-telescopes have a common focus the display image rays on the optical axis of each cell will become parallel thus eliminating the need for reading glasses. Theoretically, each such telescope rotates its image upside down but as its dimensions are below the resolution of the eye, it is like rotating each pixel of an image around itself which is un-noticeable by the user. Due to the repetitive nature of the lens array, a matte effect is achieved which eliminate scratches and fingerprint marks as well as diffuses the ambient image that is reflected from the surface of the cover glass.

It should be noted that the apparatus has common parameters and is used as a default setup. For users where the default don't provide sharp enough image at infinity, one can add a software module that will perform image processing such as using 2D image sharpening filters and or Histogram Equalization on the displayed image, where the total effect of the image processing and the optical processing will end up as a sharp and clear image. The amount of process done by the image processing can be tuned by the user at the first time he use the phone. This tuning process can be made by software that is projecting different object and the user can change some parameters of the image processing algorithm to achieve the desired sharp image. These parameters are saved for the use of this user.

It should be noted that one can combine these layers in different ways or to use part of this layer. This structure of layers is provided as an example of how the system and method can be implemented.

The apparatus can be embedded as a special layer in the display of the device or can be used as an add-on transparent element that covers the display.

Referring to the solutions presented in FIGS. 1, 2, 5 and 8—as we decrease the FOV, we can get an extra desired phenomenon of privacy. Namely only the user that holds the phone can see the display and for users that are aside, the display content will be unvisitable.

Figure 5:
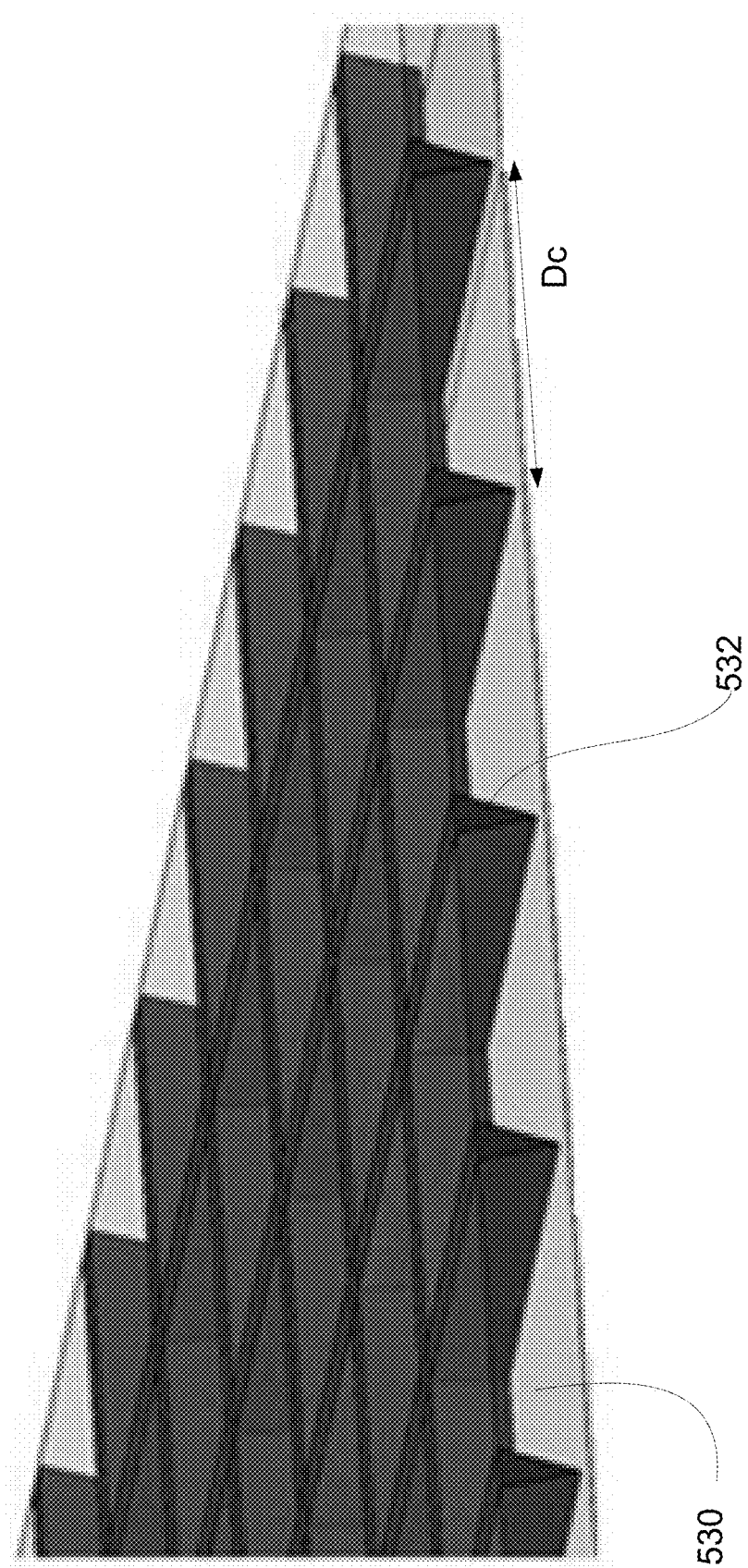
FIG. 5 is an example of one or more parts of an apparatus.

It must be noted that due to the fact that the apparatuses of FIGS. 1, 2 and 5 diffuse the ambient image and light reflected from the display, in some cases the display intensity can be decreased and still have good visibility of the display. This fact can be used to reduce the power dissipation of the display which has a significant impact on the battery life of the device.

In most of the mobile phones, there is a light sensor in the front of the display to measure the light intensity. With this information the display can use auto brightness algorithm that change the display brightness according to the ambient light. If our filters cover also the light sensor, the filters will reduce the ambient light that the sensor detects and hence will reduce automatically the brightness of the display which will reduce the power consumption of the display. In case that one doesn't cover the light sensor, similar effect can be achieved by using a software application that changes the intensity of the measured light Im to the correct Intensity Ic.

Typical correction can be Ic=Im−Bias

Where Bias—correction value.

The following are some performance analysis of the above mentioned alternatives.

Referring to FIG. 7—Dc is the dimension of the (Square) cell, without a loss of generality, the cell may be triangular, rectangular, and hexagonal or any other shape that covers the area of the display. In this configuration each cell includes a "telescope" that is composed of two positive lenses. The outer lens (having focal length of f2) is installed between spatial filters that absorb the ambient light. Focal points (distant at focal lengths f1 & f2 from first and second microlenses respectively) of the lenses are aligned to have a mutual focus. In their mutual focus, there is a gap between the black walls with a dimension of Dp (pinhole)

The size on the display that is imaged by first microlens onto the "pinhole" Dd is $$Dd = Dp * \frac{U}{H}$$

Note: In order to avoid Moiré effects, Dd may be different from the size of Dpix the display pixel because the blur circle of the eye is larger than the size of a modern, high resolution, display pixel The geometric de-magnification is M. Where $$M = H/U$$

and $$f1 = H/(1+M)$$

G the gain brightness of the display power that is transmitted through each cell is $$G = \left(\frac{f2}{H}\right)^2$$

The Field Of View (FOV) of the display power that is transmitted through each cell is $$FOV = \frac{Dd}{U} * \frac{H}{f2}$$

namely $$FOV = \frac{Dd}{U} / \sqrt{G}$$

As an Example:

Let's assume that the units are μm and the dimensions are of the optical paths (include indexes of refractions) U=1000, Dpix=44, Dc=50, Dd=100, H=100, f2=100, n=1.5 is the average index of refraction of the clear material Then:

$$Dp = Dd * \frac{H}{U} = 100 * \frac{100}{1000} = 10$$

$$M = H/U = 100/1000 = 0.1$$

$$f1 = H/(1+M) = 100/1.1 = 91$$

$$G = f2/H = 1.$$

Note that cell and pitch sizes are below the resolution of the eye $$FOV = \frac{100}{1000} * \frac{100}{100} = 100 \text{ mRad} = 5.73°$$

The net foil thickness is as follows:

The total optical thickness is (H+f2)/n=200/1.5=133

The improvement in contrast is achieved by the flowing means:

a. Almost all light rays that enter the lens array from the outside are trapped and cannot go out b. Anti-Reflective Coating (ARC) on the entrance lenses will lower their reflectance by an order of magnitude c. The convex surface of the outer lenses and their small size, below the resolution limit of the eye, will make this surface appear matte thus, eliminating sharp reflection of the residual ambient and further reducing its annoyance The improvement in the display contrast in the above example may be evaluated as follows:

let

Display Gain: $G=1$

ARC=0.1, MATTE=0.1 (effectively equivalent)

Hence: The total contrast gain=G/(ARC*MAT)=1/(0.1*0.1)=1/0.01=100

Following is a calculated example of the option with the negative lens array. We will refer to FIG. 8.

Let assume that:

Dimensions are of optical paths (include indexes of refractions)

U=1000, Dpix=44, Dc=50, θw=5°, H=20, n=1.5 is the average index of refraction of the clear material Then:

$$\tan(\alpha) = Dc/2U$$

$$\tan(\theta w) = Dc/2V$$

$$1/f1 = 1/V + 1/U = 2\tan(\alpha)/Dc + 2\tan(\theta w)/Dc$$

Hence $$1/f1 = 2/Dc * [(\tan(\alpha) + \tan(\theta w)]$$

$$f1 = Dc/[2([Dc/2U + \tan(\theta w)] = 222$$

$$V = Dc/2\tan(\theta w) = 286$$

$$M = V/(V-H) = 1/(1-H/V) = 286/266 = 1.075$$

$$G = 1/M2 = (1-H/V)2 = 0.87 \text{ is the display brightness gain.}$$

$$i.FOV = \frac{Dd}{U} * M = \frac{100}{1000} * 1.075 = 107.5 \text{ mRad} = 6.16°$$

Net Foil Thickness:

The total optical thickness is H/n=20/1.5=13.3 um

This is a very thin film which will require adding a base layer.

In the detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to an apparatus capable of executing the method.

Any reference in the specification to an apparatus should be applied mutatis mutandis to a method that may be executed by the apparatus.

The term "and/or" is additionally or alternatively.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

However, other modifications, variations and alternatives are also possible. The specifications and drawings are, accordingly, to be regarded in an illustrative rather than in a restrictive sense.

The phrase "may be X" indicates that condition X may be fulfilled. This phrase also suggests that condition X may not be fulfilled. For example—any reference to a apparatus as including a certain component should also cover the scenario in which the apparatus does not include the certain component.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the apparatus and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

Any combination of any component of any component and/or unit of apparatus that is illustrated in any of the figures and/or specification and/or the claims may be provided.

Any combination of any apparatus illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. An apparatus for enhancing display visibility of a display that comprises multiple display pixels, the apparatus consists essentially of:
   an array of spatial filters that are construed and arranged to block side ambient radiation; wherein each spatial filter has a minimal thickness of microscopic scale;
   transparent elements that are positioned between the spatial filters of the array;
   a first array of microlenses and a second array of microlenses, wherein the first array of microlenses and the second array of microlenses are spaced apart from each other and are configured to direct radiation generated by the display to propagate through the transparent elements without impinging on the array of spatial filters, while simulating infinity focus;
   wherein the array of spatial filters is positioned in a gap between the first array of microlenses and a second array of microlenses, wherein one end of the array of spatial filters contacts the first array of microlenses and a second end of the array contacts the second array of microlenses.

2. The apparatus according to claim 1, wherein the apparatus is configured to convert the radiation generated by the display to the output radiation without introducing human perceivable distortions and loss of resolution.

3. The apparatus according to claim 1, wherein the second array of microlenses is configured to disperse ambient radiation that is reflected from the display and impinges on the second array of microlenses.

4. The apparatus according to claim 1, wherein the apparatus consists of the array of spatial filters, the transparent elements, the first array of microlenses and the second array of microlenses.

5. The apparatus according to claim 1, wherein the first and second arrays of microlenses form an array of micro-binoculars.

6. The apparatus according to claim 5, wherein each single micro-binocular is associated with a part of a pixel or a pixel and its at least one other pixel adjacent to the pixel.

7. The apparatus according to claim 1, wherein each display pixel is associated with a single microlenses of the first array of microlenses, with a single microlenses of the second array of microlenses, with a single transparent element, and with a single spatial filter.

8. The apparatus according to claim 1, wherein a focal point of a microlenses of the first array of microlenses overlaps a focal point of a corresponding microlenses of the second array of microlenses.

9. The apparatus according to claim 1, wherein the second array of microlenses comprises negative microlenses; and wherein the first array of microlenses comprises positive microlenses.

10. The apparatus according to claim 1, wherein the first and second arrays of microlenses form an array of micro-telescopes.

11. The apparatus according to claim 10, wherein each single micro-telescope is associated with a part of a pixel or a pixel and its surrounding.

12. The apparatus according to claim 1, comprising an anti-reflective coating layer.

13. The apparatus according to claim 1, wherein the first array of microlenses is positioned between an interior end of the array of spatial filters and an exterior end of the array of spatial filters.

14. The apparatus according to claim 1, wherein the first array of microlenses is positioned below the array of spatial filters.

15. The apparatus according to claim 1, wherein the second array of microlenses is positioned above an interior end of the array of the spatial filters.

16. The apparatus according to claim 1, wherein the microlenses of the first array of microlenses and the microlenses of the second array of microlenses are positioned at opposite sides of an interior plane located at the interior end of the array of the spatial filters.

17. The apparatus according to claim 16, wherein the array of the spatial filters defines an array of apertures that are positioned at the interior plane.

18. The apparatus according to claim 17, wherein focal points of microlenses of the first array of microlenses are positioned at the interior plane.

19. The apparatus according to claim 18, wherein focal points of microlenses of the second array of microlenses are positioned at the interior plane.

20. The apparatus according to claim 1, wherein the second array of microlenses are configured to disperse reflected ambient radiation that impinges on the second array of microlenses.

21. A method for enhancing display visibility of a display that comprises multiple display pixels, the method comprises:
   blocking, by an array of spatial filters side, ambient radiation; wherein the array of spatial filters belong to an apparatus that consists essentially of the array of spatial filters, transparent elements that are positioned between the spatial filters of the array, a first array of microlenses and a second array of microlenses that are spaced apart from each other, wherein each spatial filter has a minimal thickness of microscopic scale;
   wherein the array of spatial filters is positioned in a gap between the first array of microlenses and a second array of microlenses, wherein one end of the array of spatial filters contacts the first array of microlenses and a second end of the array contacts the second array of microlenses;
   enabling, by the transparent elements, radiation generated by the display to propagate outwards; and
   directing, by the first and the second arrays of microlenses, radiation generated by the display to propagate through the transparent elements without impinging on the array of spatial filters, while simulating infinity focus.

* * * * *